United States Patent [19]
Goodson, Jr.

[11] Patent Number: 5,482,356
[45] Date of Patent: Jan. 9, 1996

[54] REAR DUMP TRAILER

[75] Inventor: Albert A. Goodson, Jr., Houston, Tex.

[73] Assignee: Goodson Building Systems, Inc., Houston, Tex.

[21] Appl. No.: 221,065

[22] Filed: Mar. 31, 1994

[51] Int. Cl.$^6$ ........................................................ B60P 1/04
[52] U.S. Cl. ........................................ 298/22 AE; 298/17 R
[58] Field of Search ................................ 298/17 R, 19 R, 298/22 R, 22 AE

[56] References Cited

U.S. PATENT DOCUMENTS

| | | | |
|---|---|---|---|
| 1,805,489 | 5/1931 | Kerr et al. . | |
| 2,490,532 | 12/1949 | Maxon, Jr. | 246/184 |
| 3,003,818 | 10/1961 | Merchant | 298/22 AE |
| 3,055,710 | 9/1962 | Black | 298/22 AE |
| 3,751,102 | 8/1973 | Stoneburner . | |
| 3,844,616 | 10/1974 | Acker . | |
| 3,897,972 | 8/1975 | Logue | 296/184 |
| 4,230,360 | 10/1980 | Eisenman . | |
| 4,273,381 | 6/1981 | Bibeau et al. | 298/22 R |
| 4,437,699 | 3/1984 | Lewis et al. . | |
| 4,865,341 | 9/1989 | Hicks | 298/22 AE |
| 4,948,155 | 8/1990 | Smith et al. | 298/22 AE |
| 5,090,773 | 2/1992 | Guillaume . | |
| 5,096,336 | 3/1992 | Merrett et al. . | |
| 5,322,350 | 6/1994 | Hinson | 298/1 R |

FOREIGN PATENT DOCUMENTS 2002222   10/1969   France .............................. 298/22 AE

OTHER PUBLICATIONS

"Fruehauf Frameless Steel Rock Dump Trailer", Two Sheets published prior to 1993 by Fruehauf Corporation.

Primary Examiner—David A. Bucci
Assistant Examiner—Gregory A. Morse
Attorney, Agent, or Firm—Bush, Moseley, Riddle & Jackson

[57] ABSTRACT

A trailer (10) has a shell (12) of a semicircular shape with U-shaped reinforcing ribs (50) spaced longitudinally along the length of the shell (12). The reinforcing ribs (50) are of an increasing depth from the upper ends thereof to the bottoms thereof at the bottom (55) of the shell (12). A hoist (86) is mounted in inverted relation about trunnions (94) adjacent the bottom of front end wall (90) of shell (12) to minimize stress concentrations and is easily removed by removal of brackets (120) secured to opposed support members (88) on front end wall (90).

11 Claims, 4 Drawing Sheets

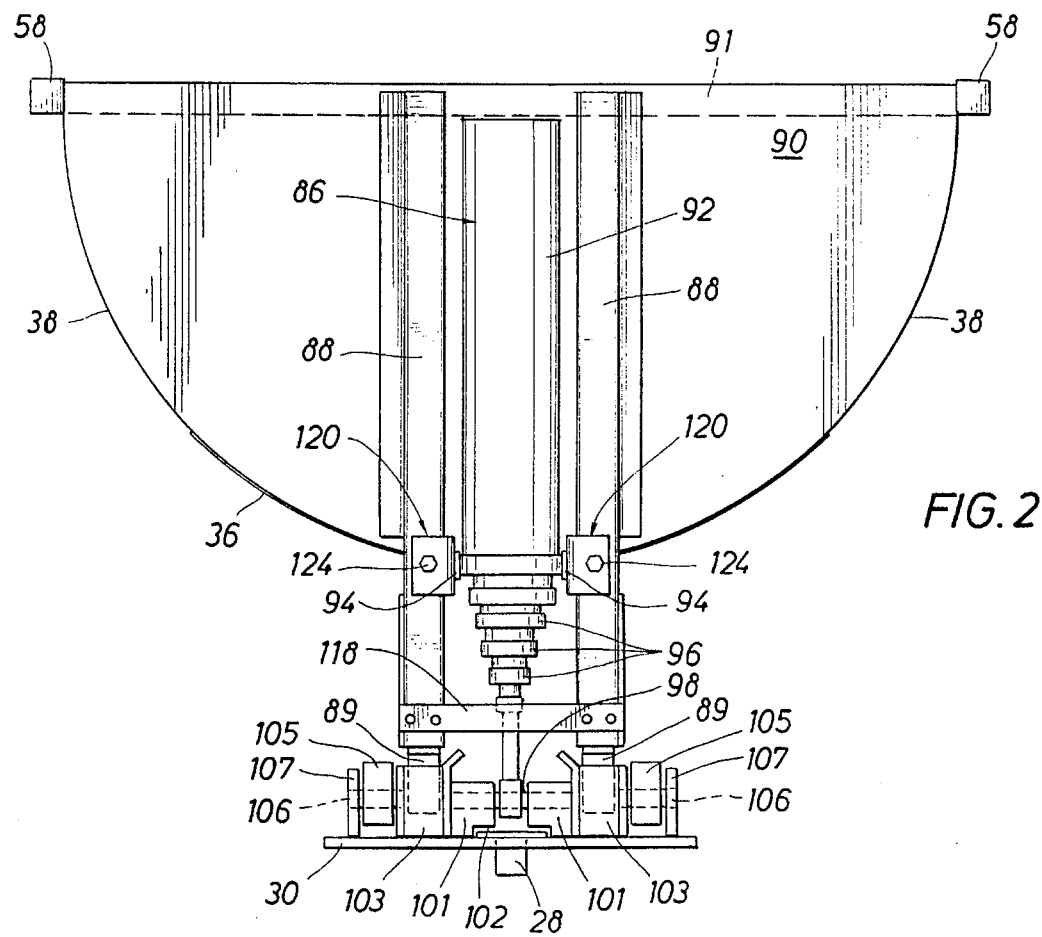
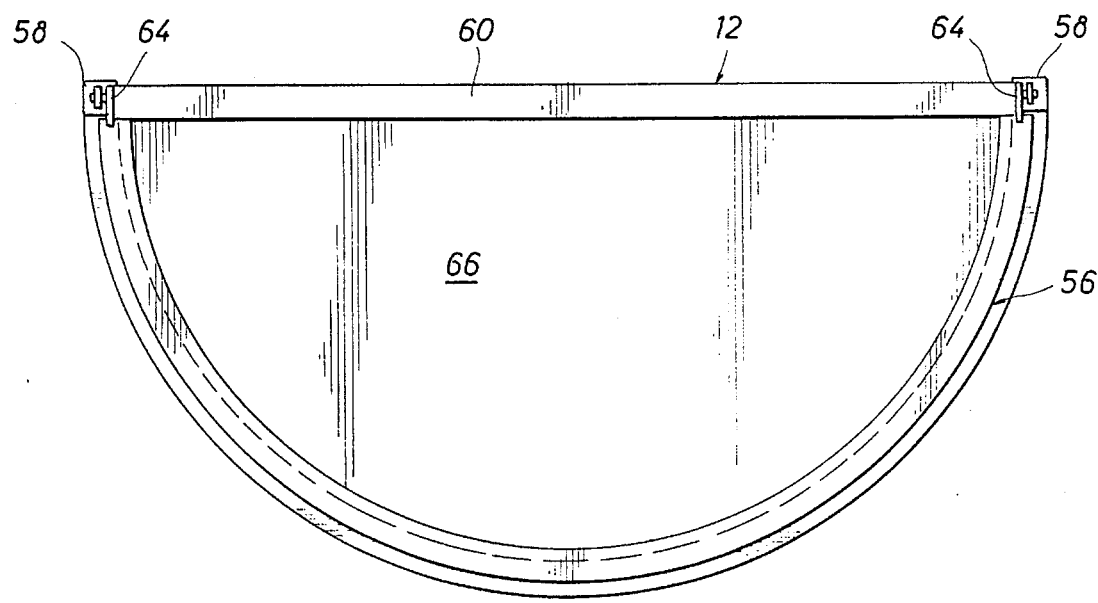

REAR DUMP TRAILER

BACKGROUND OF THE INVENTION

1. Field of the Invention

This invention relates to rear dump trailers and more particularly to a rear dump trailer having an arcuate body and adapted to be connected to the fifth wheel of a tractor for transport.

2. Prior Art

Heretofore, rear dump trailers have been formed with arcuate bodies or shells having a king pin on the front end of the trailer removably connected to a fifth wheel on the rear of a tractor for over the road movement. Such rear dump trailers have also been provided with extendible fluid pressure actuated hoists for raising the front end of the trailer at an inclined position of around 35–45 degrees relative to the tractor for rear end gravity dumping of lading from the dump trailer.

The rear end portion of a dump trailer is usually supported by a chassis having two wheeled axles and is mounted on the chassis for pivotal movement about a horizontal axis during unloading. Relatively large loads or forces are provided against the pivotal axis during the unloading operation particularly at the uppermost raised position of the trailer when the trailer is fully loaded. A trailer normally has a transverse bolster adjacent its rear end carrying the pivotal connection secured to the arcuate body. Relatively large loads are transferred between the bolster and the arcuate body or shell and it is desirable that stress concentrations between the bolster and shell be minimized. High stress concentrations oftentimes cause fatigue cracks after prolonged periods of time under maximum load conditions and it is highly desirable that fatigue cracks be minimized or eliminated.

U.S. Pat. No. 3,844,616 dated Oct. 29, 1974 shows a rear dump trailer having a king pin at its forward end portion for connection to the fifth wheel of a tractor. The trailer includes a shell which is in the shape of a half ellipse and is of a uniform thickness. The rear end portion of the trailer body is supported on a chassis having a pair of wheeled axles for pivotal movement about a horizontal axis positioned between the wheeled axles. However, transversely extending side reinforcing members do not extend beneath the shell. A hydraulic cylinder is mounted on the front end of the trailer for raising the front end of the trailer for dumping but cannot be easily removed from the trailer body.

It is common to provide transversely extending reinforcing ribs spaced longitudinally along the length of a trailer body and secured to the outer surface of the trailer body or shell for reinforcing the shell. Trailer bodies or shells have been formed heretofore of an arcuate shape and the reinforcing ribs have been secured to the outer surface of the arcuate shell. However, the reinforcing ribs have not usually been of an arcuate shape. The maximum loading for an arcuate shell, such as a shell of a semicircular shape, is normally exerted along the center of the bottom of the shell. Thus, it is desirable for the most efficient design to have reinforcing ribs of a maximum strength beneath the bottom of the shell. Reinforcing ribs for arcuate shells heretofore have not been formed of a maximum strength or maximum cross sectional area at the bottom of the shell and oftentimes the ribs have not been of an arcuate shape.

SUMMARY OF THE INVENTION

The present invention is particularly directed to a lightweight rear dump trailer having a generally semicircular body or shell. A plurality of generally U-shaped or arcuate transverse reinforcing members or ribs of a channel-shaped cross section are secured to the outer surface of the semicircular shell at intervals of between six (6) and ten (10) feet along the length of the shell for reinforcing the shell. The depth of the U-shaped reinforcing members increases from a minimum at its upper end to a maximum at the bottom to provide a maximum strength at the bottom center and a minimum strength at the upper end. Thus, the maximum strength of the structural trailer body is provided along the longitudinal center of the bottom or floor of the shell.

The semicircular shell of the trailer is the principal structural member primarily as the result of its shape and the reinforcing members or ribs also having an inner semicircular shape for contacting the outer semicircular surface of the shell. The ribs which have a semicircular inner surface prevent the semicircular shell or arch from collapsing when loaded and are tapered from top to bottom with minimum stress at the top and maximum stress at the bottom. The semicircular shell is preferably formed of a steel sheet or plate material less than ¼ inch in thickness thereby to provide a minimum tare weight for the trailer to permit a maximum payload. The semicircular shape is self centering to facilitate unloading of the trailer. The semicircular shape is inherently a very efficient structural member and has a high strength/weight ratio. It has been calculated that the maximum stress for a semicircular shell of a rear dump trailer during use is at the center of the bottom of the shell. The present reinforcing ribs have been designed based on this calculation.

A chassis including a pair of wheeled axles is provided to support the rear of the trailer. The chassis has bearings supporting a horizontal pivot axis for a bolster fixed to the shell and extending between the shell and the bearings. The bolster includes vertically extending inner and outer generally parallel plates extending between the pivot axis and the shell. A transverse U-shaped reinforcing rib is provided at the bolster over the pivot axis, and longitudinally extending stiffener plates extend from the transverse rib longitudinally along the shell to provide additional strength. Relatively large loads are transferred between the shell and chassis to form high stress concentrations. The present design of the bolster and reinforcing members minimizes stress concentrations to minimize any fatigue cracks after prolonged periods of operation under maximum load conditions. Also, the trailer bed or shell may be raised to its uppermost inclined position without any raising of the wheels of the chassis. The pivotal axis of the shell is in a forward position located centrally between the axles and this permits a full tilting of the trailer bed with the rear lower end of the shell spaced around fifteen (15) inches from the ground or supporting surface at the full tilt position.

As an example for fabricating the semicircular shell from a plurality of steel sheets, and utilizing steel sheets of a ten (10) gauge thickness for the bottom section and a twelve (12) gauge thickness for the side sections, individual steel sheets are first rolled to the desired radius and then welded together. In one design three transverse welds are provided with a small width splice plate welded over each transverse weld. Then a U-shaped reinforcing rib is welded at each transverse weld over the splice plate. Tubular box shaped side rails are welded along the upper edges of the shell to provide upper longitudinally extending reinforcing members.

An object of this invention is to provide a lightweight rear dump trailer utilizing a shell of a semicircular shape as the primary structural member without any reinforcing sills or members extending the length of the shell except a pair of upper side rails.

Another object of this invention is to provide such a lightweight dump trailer utilizing a plurality of spaced transverse reinforcing members having an increasing strength from the upper sides of the shell to the bottom of the shell.

A further object of this invention is to provide such a lightweight design for a trailer in which the shell is formed of a maximum strength at its bottom and a minimum strength at its upper end.

Another object of this invention is to provide a lift or hoist engaging the bottom of the dump trailer for raising the trailer with the hoist being easily removed from the trailer for repair or replacement while the trailer remains in a loaded condition.

An additional object of this invention is to provide an improved method of fabricating a semicircular dump trailer body or shell from steel sheets or plates having thickness less than ¼ inch.

Other objects, features, and advantages of the invention will become more apparent after referring to the following specification and drawings.

BRIEF DESCRIPTION OF THE DRAWINGS

FIG. 2 is a front end elevation showing the hoist on the front end of the trailer for lifting the trailer to a desired height for dumping;

FIG. 3 is a rear end elevation of the dump trailer shown in FIGS. 1 and 2 illustrating the tailgate adjacent the rear end of the trailer bed;

DESCRIPTION OF THE INVENTION

Figure 1:
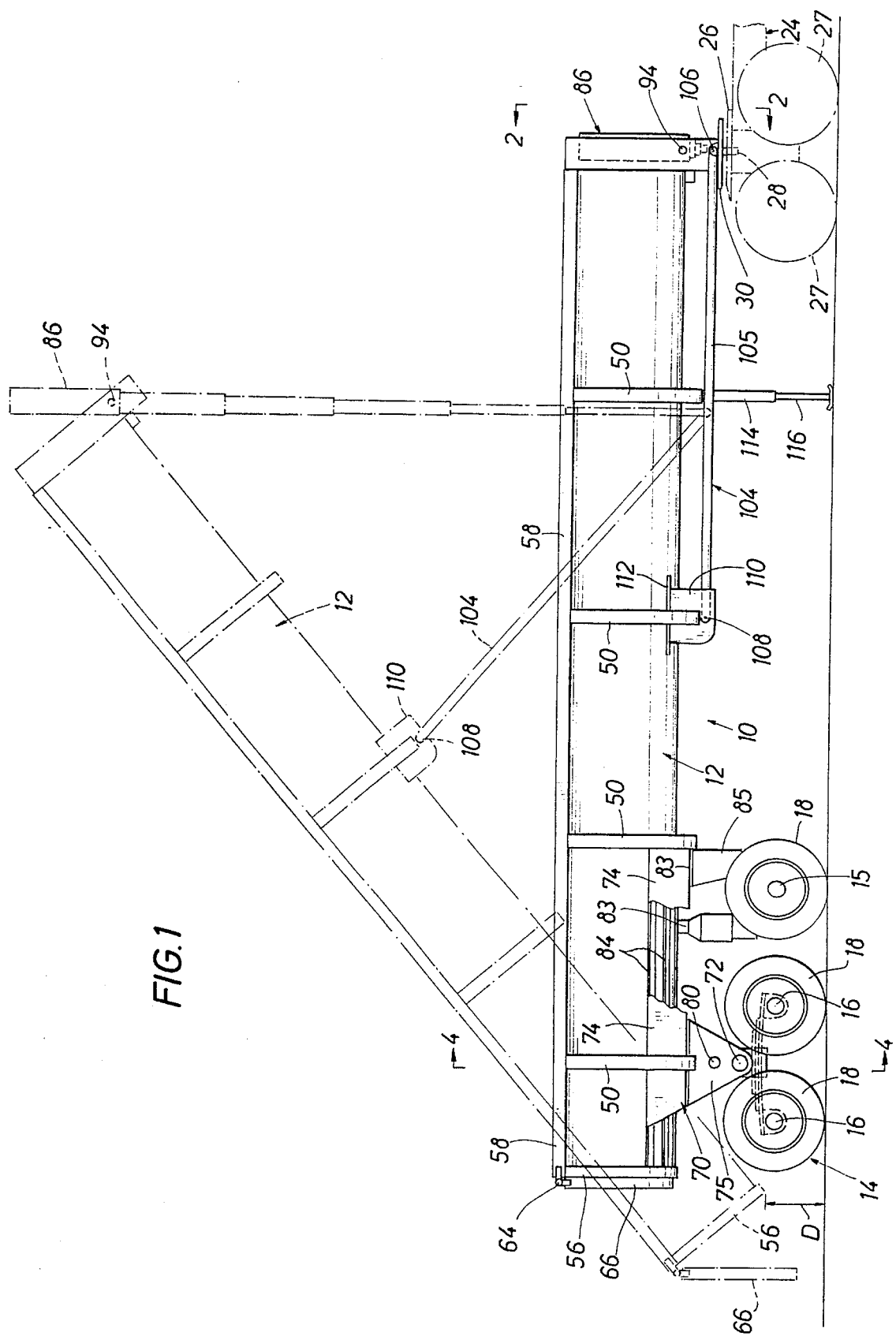
FIG. 1 is a side elevation of a dump trailer comprising the present invention and showing the raised position of the trailer bed in broken lines.

Referring now to the drawings for better understanding of the invention and more particularly to FIGS. 1–3, a trailer in accordance with the present invention is shown generally at 10 including a trailer body having a bed or shell generally indicated at 12 and supported adjacent its rear end on a chassis generally indicated at 14. Chassis 14 comprises a pair of spaced axles 16 having dual wheels 18 on the ends of axles 16 and a pair of resilient suspension members 20 supporting bearings 22 for pivotally supporting trailer bed 12 thereat. A third axle 15 having dual wheels 18 is separately mounted on an air ride suspension system for supporting bed 12. A tractor shown partially at 24 is provided for supporting the front end of trailer 10 and has a fifth wheel 26 adjacent its rear end over wheels 27 adapted to receive a king pin 28 carried by a pivoted plate 30 on the front end of trailer 10 for over the road travel or transport of trailer 10.

Figure 5:
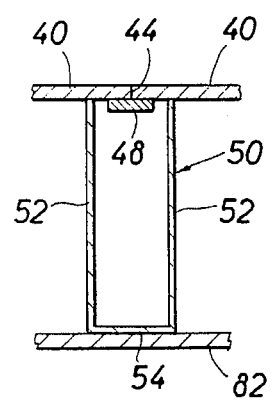
FIG. 5 is a section taken along line 5—5 of FIG. 1 and showing a U-shaped reinforcing rib in cross section.
Figure 8:
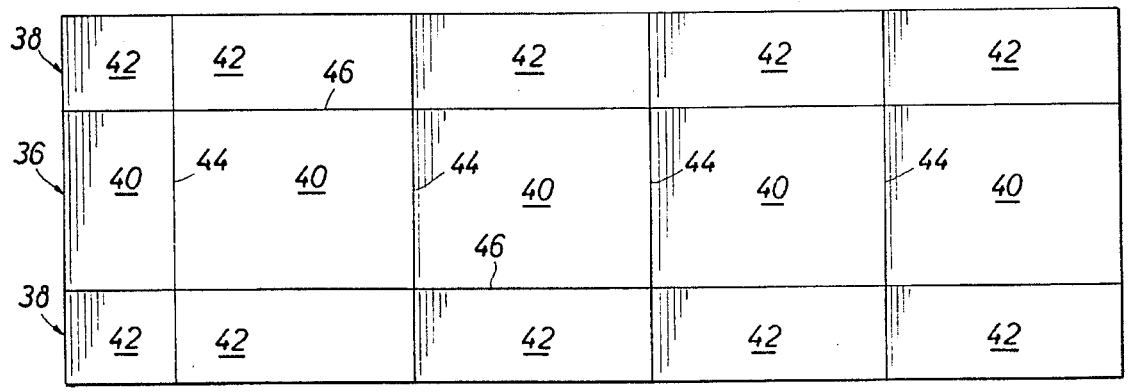
FIG. 8 is a plan view of a layout of the steel sheets for subsequent rolling and welding to form the shell for the trailer.

Shell 12 includes a bottom center section 36 and a pair of side sections 38 welded thereto. Center section 36 is preferably formed of steel having a thickness greater than the thickness of side sections 38. For example, center section 36 may be formed of ten (10) gauge rolled steel sheets (0.139 inch in thickness) and side sections 38 may be formed of twelve (12) gauge rolled steel sheets (0.105 inch in thickness). As shown in FIG. 8 as an example for fabrication of shell 12, center section 36 may be formed of five plates 40 and each side section 38 is formed of five plates 42. Plates 40 and 42 are first rolled to the desired radius, and then welded together along transverse weld seams 44 and longitudinal weld seams 46 to form shell 12. Splice plates 48 as shown particularly in FIG. 5 are welded along transverse weld seams 44.

A plurality of transversely extending reinforcing members or ribs generally indicated at 50 are spaced longitudinally along the length of shell 12. Each rib 50 is of a generally U-shape secured to the outer surface of shell 12 and has a channel-shaped cross section as shown in FIG. 5. Each rib 50 includes a pair of parallel side plates 52 connected to an end or web 54. Side plates 52 are welded directly to the outer surface of shell 12 over splice plate 44. As shown particularly in FIG. 4, reinforcing rib 50 increases in depth, as measured in a direction perpendicular to the outer surface of shell 12, from its upper end to its lower end at the bottom of shell 12 shown at 55. As a specific but non-limiting example of rib 50, the depth of reinforcing rib 50 at its upper end may be around three (3) inches and around ten (10) inches to sixteen (16) inches at its bottom shown at 55. For best results, the maximum depth of rib 50 at its bottom is around three (3) to five (5) times greater than the minimum depth at its upper end.

For fabricating ribs 50 and shell 12, an inverted semicircular jig is utilized. Transverse sections of plates after being rolled are positioned on the inverted semicircular jig and then welded together with splice plates 48 positioned over the weld seams. Next, the ribs 50 are positioned on the jig over splice plates 48 and welded to shell 12.

In the event separate plates 40 and 42 are first welded together along weld seams 46 to form transverse semicircular sections, plates 40 and 42 are first placed on the semicircular jig before plates 40 and 42 are welded to each other along weld seams 46.

An end reinforcing rib 56 is provided at the rear end of shell 12 and is of a uniform depth as shown particularly in FIG. 3. A reinforcing side rail shown generally at 58 is mounted over the upper edge of each side section 38 and is of a box-shaped cross section. An upper horizontally extending tubular support 60 is secured between side rails 58. Support brackets 64 on tubular support 60 support a tailgate 66 for pivotal movement. Tailgate 66 is releasably latched in a closed position by suitable latching (not shown) as well known.

While shell 12 is shown in the drawings as having a center section 36 and side sections 38, shell 12, if desired may be formed of continuous transverse sections welded to each other along transverse weld seams 44 while eliminating longitudinal weld seams 46. Shell 12 is formed of steel sheets or plates having a thickness less than ¼ inch and preferably less than 3/16 inch as steel sheets are less than 3/16 each in thickness.

Figure 4:
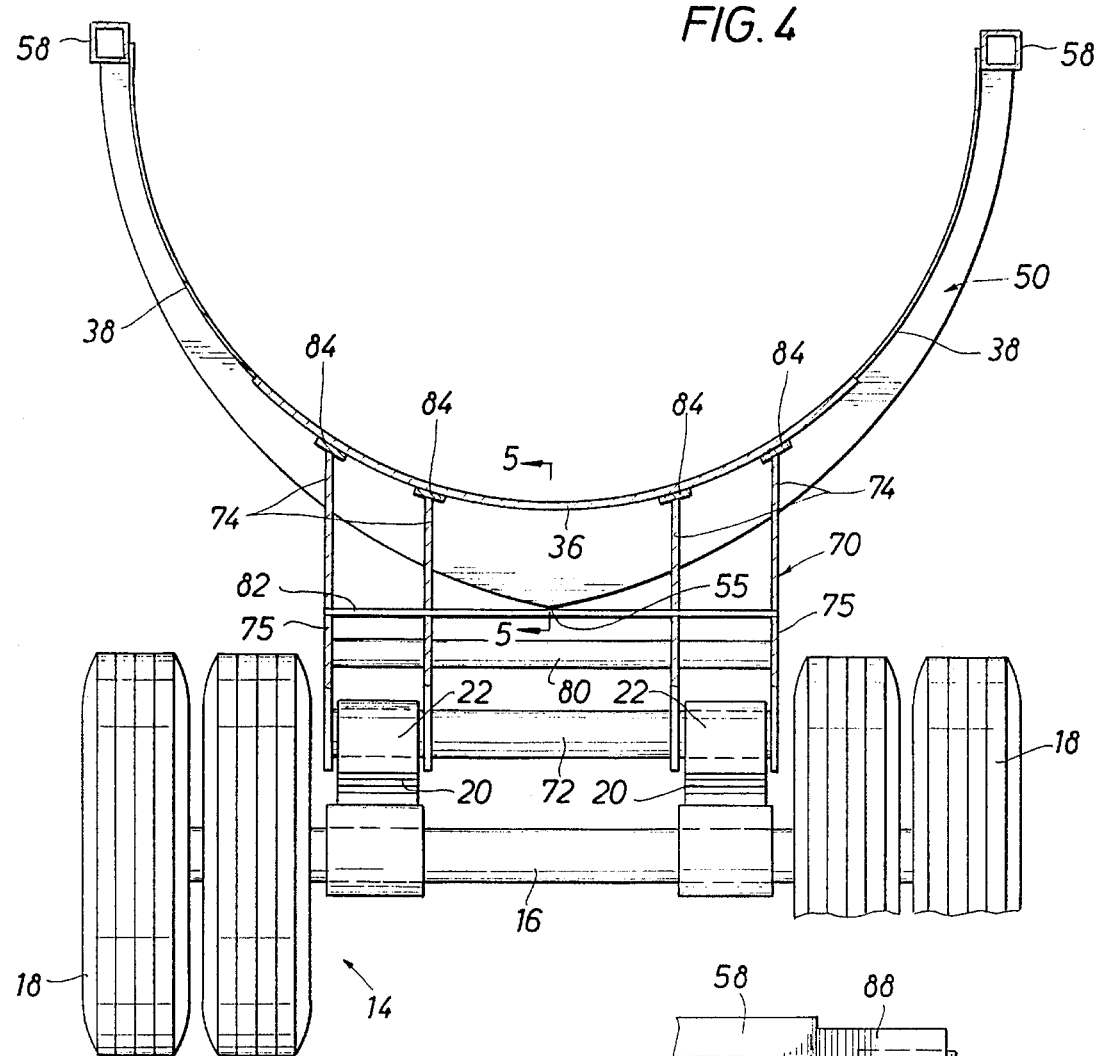
FIG. 4 is a section taken generally along line 4—4 of FIG. 1 and showing a bolster for the trailer including a U-shaped reinforcing rib secured to the shell.

The rear end of the trailer body has a body bolster structure generally indicated at 70 as shown particularly in FIGS. 1 and 4 and supported on chassis 14 about a generally horizontal pivotal axis formed by shaft 72 located generally centrally of the distance between axles 16. Bolster structure 70 includes a plurality of parallel vertically extending upper and lower plates 74, 75. Lower plates 75 are secured at their lower ends to shaft 72 supported for rotation on bearings 22 of chassis 14. An upper horizontal stabilizing bar 80 extends between lower plates 75. A horizontal stabilizer plate 82 is secured between plates 74, 75 for stiffening of plates 74 and 75. Plates 74 extend vertically to outer shell 12 and are welded to longitudinally extending stiffener plates 84 on shell 12 which extend longitudinally along shell 12 from both sides of the adjacent U-shaped rib 50. Plates 74 extend longitudinally between adjacent ribs 50. Reinforcing strips or members 84 extend in a generally horizontal direction from superjacent rib 50 over chassis 14 to end reinforcing rib 56 on one side of superjacent U-shaped rib 50 and extend to the adjacent rib 50 on the other side of superjacent U-shaped reinforcing rib 50. Transverse support members 83 extend transversely between the lower ends of plates 74 for supporting an axle 15 and dual wheels 18 on a support frame 85 for an air ride suspension system. For further details of the air ride suspension system, reference is made to an air lift suspension system of Watson & Chalin Mfg. Inc., McKinney, Tex. designated as WCAL-2200 series in a 1992 publication.

Bolster structure 70 transfers loads between shell 12 and chassis 14 through shaft 72. Also, loads are transferred from bolster structure 70 through transverse members 83 and support frame 85. The loads are distributed along the outer surface of shell 12 by longitudinally extending reinforcing strips 84 secured to vertical plates 74 in addition to reinforcing ribs 50. Thus, a relatively large area of shell 12 is utilized for the distribution of stress thereby to minimize stress concentrations for shell 12.

For raising the upper end of trailer 10 for unloading, a hoist shown generally at 86 is positioned between a pair of spaced parallel support members 88 secured to end wall 90 of shell 12 and having saddle supports 89. A reinforcing transverse member 91 is secured to the inner surface of wall 90 between side rails 58 for transferring loads therebetween. Hoist 86 includes a hydraulic cylinder 92 having opposed fixed trunnions 94 pivotally connected to support members 88 adjacent the lower ends of support members 88. A plurality of extendible piston rods 96 of different diameters are received within cylinder 92 in telescoping relation. Cylinder 92 may be a single acting cylinder and actuated by a suitable source of hydraulic fluid (not shown) controlled by tractor 24. Small diameter piston rod 96 is pivotally connected at pivot pin 98. A pair of support blocks or bearings 101 are mounted on plate 30 with each block 101 having a notch 102 at its lower end to receive the upper end of king pin 28 on support plate 30 thereby to transfer any loads from hoist 86 directly to support plate 30 and fifth wheel 26 for bypassing king pin 28. A relatively short length pivot pin 98 is also provided since support blocks 101 are closely spaced from each other. Lower support saddles 103 are mounted on support plate 30 beneath upper saddle supports 89 to support upper saddle supports 89 in the lowered position of trailer 10. Upper saddle supports 89 have semicircular recesses 100 to receive lower support saddles 103 when shell 14 is in a lowered horizontal position with hoist 86 deactivated as shown in FIG. 6.

To support shell 12 when trailer 10 is not supported on the rear end of tractor 24 and to assist hoist 86 in maintaining the stability of trailer 10 when shell 12 is raised for dumping, a brace support assembly generally indicated at 104 is provided as shown particularly in FIG. 1. Brace support assembly 104 has a pair of brace arms 105 with front ends thereof fitting between lower saddles 103 and brackets 107 mounted on pivot plate 30. Pivot pins 106 between lower saddles 103 and brackets 107 mount brace arms 105 for pivotal movement. The rear ends of brace arms 105 are pivoted at 108 to a pair of spaced vertical plates 110 secured to shell 12. A longitudinally extending reinforcing member 112 is secured to shell 12 at each plate 110 for reinforcing plates 110 and minimizing stress concentrations. Brace support assembly 104 has a stand 114 including adjustable telescoping legs 116 to support trailer 12 independently of fifth wheel 26 and tractor 24 when trailer 12 is empty.

The highest concentration of stress usually occurs at trunnions 94 of hoist 86 when shell 12 is raised for unloading by gravity. Thus, support members 88 are designed to minimize stress concentrations and hoist 86 which is in an inverted relation is mounted by trunnions 94 at the bottom of end wall 90. The lower projecting ends of support members 88 extend below end wall 90 and a removable bar 118 secured by nut and bolt combinations extends between the projecting ends of support members 88 to provide strengthening thereat.

Figure 6:
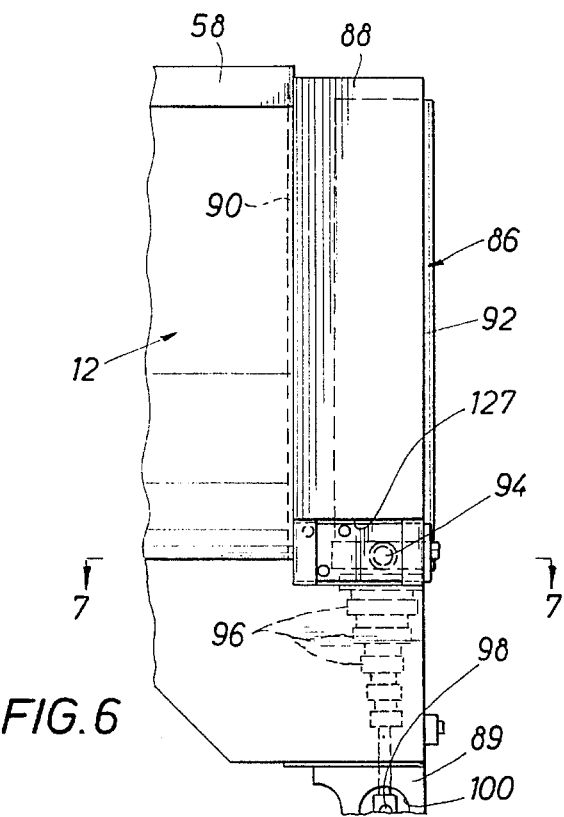
FIG. 6 is an enlarged partial elevational view of the hoist connected to a front end of the trailer for lifting the trailer.
Figure 7:
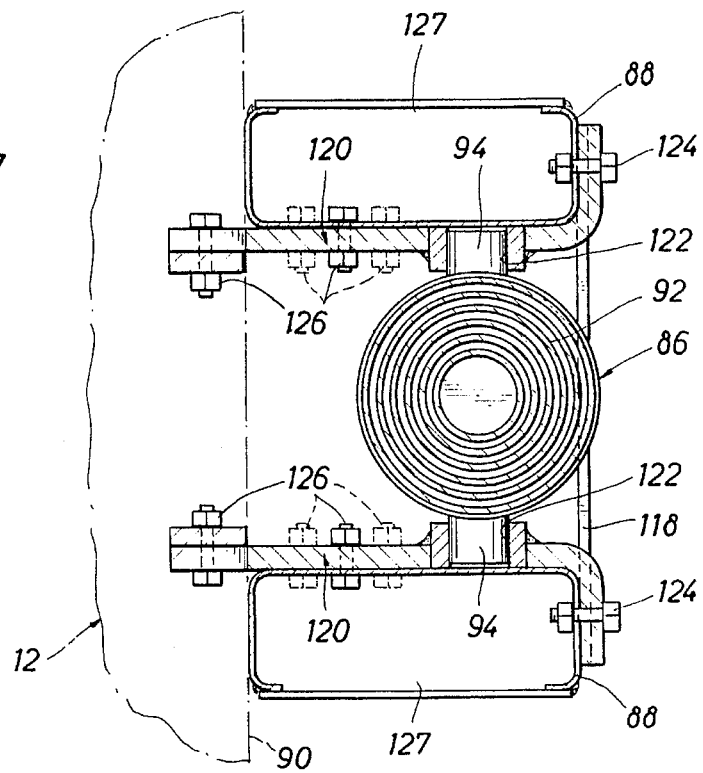
FIG. 7 is a section taken generally along line 7—7 of FIG. 6 showing the hoist removably mounted on the rear end wall of the trailer and adapted for removal from the trailer.

It may be desirable to remove hoist 86 from trailer 10 for repair or replacement, and for that purpose hoist 86 is mounted for removal from support members 88 while trailer 10 remains in a loaded condition as shown particularly in FIGS. 2, 6, and 7. An angle-shaped support bracket 120 is removably mounted to each support member 88 and has a reinforced opening 122 receiving a trunnion 94 of hoist 86. Each support bracket 120 includes studs 124 on one leg and studs 126 on the other leg with suitable nuts for securing studs 124 and 126. A portion of each support member 88 is removed or cut away at 127 adjacent studs 126 so that studs 126 are manually accessible for removal by a suitable wrench or the like. For removal of hoist 86, pivot pin 98 for innermost cylinder rod 96 is removed from pivot plate 30. Then, bar 118 is removed. Next, studs 124 and 126 on angle-shaped brackets 120 are removed. Then, brackets 120 supporting trunnions 94 are slipped outwardly from support members 88 for removal of hoist 86 while trailer 10 remains in a loaded relation. Hoist 86 may be repaired or replaced with another hoist. A reverse procedure may be employed for installation of hoist 86. It may be desirable to provide an additional reinforcing member adjacent cutaway portion 127 for stiffening support member 88 thereat. If desired, flat plates may be substituted for angle-shaped brackets 120 with suitable studs arranged in a single plane.

As dump trailer stresses are normally concentrated along front wall 90 of shell 12, hoist 86 is pivotally mounted in an inverted relation about trunnions 94 adjacent the bottom of wall 90. Since shell 12 is lifted from the bottom of end wall 90, semicircular shell 12 provides a highly efficient structural member with maximum stress at the bottom of shell 12. U-shaped reinforcing ribs 50 by having an increased depth adjacent the bottom of shell 12, and bottom sheets 40 by having an increased thickness increase the strength of shell 12 along its bottom 55. Reinforcing rib 50 over bolster structure 70 provides a strong structural member between bolster structure 70 and shell 12. Trailer 10 is designed to dump at an inclination of around forty (40) degrees although inclinations between thirty-five (35) degrees and forty-five (45) degrees may be utilized for dumping under certain conditions. Trailer 10 is normally used for the transport of gravel, asphalt, sand, dirt, or other aggregate. When trailer 10 is in its maximum dumping position, such as forty (40) degrees, the rear end of shell 12 is spaced around fifteen (15)

inches from the supporting surface as shown at D in FIG. 1 and does not contact chassis 14 since shell 12 is of a semicircular shape and is received between the rear wheels 18 without any tilting of wheels 18. As an example of a typical trailer, shell 12 may be of a length of thirty-seven (37) feet formed of ten (10) gauge and twelve (12) gauge A36 steel sheets rolled and welded together to form lower section 36 and side sections 38 of shell 12. Reinforcing ribs 50 have a maximum depth of twelve (12) inches at the bottom of shell 12 and a minimum depth of three (3) inches adjacent side rails 58. A weight of around 10,000 lbs for a thirty-seven (37) foot trailer is obtained thereby to provide a lightweight construction for trailer 10. For an optimum design with a minimal tare weight and a maximum payload, trailer 10 is of a length over around thirty-five (35) feet and ribs 50 are spaced at intervals of at least over around six (6) feet. An optimum spacing of ribs 50 of around eight (8) feet is desirable with a maximum spacing less than around ten (10) feet.

While a preferred embodiment of the present invention has been illustrated in detail, it is apparent modifications and adaptations of the preferred embodiment will occur to those skilled in the art. However, it is to be expressly understood that such modifications and adaptations are within the spirit and scope of the present as set forth in the following claims.

What is claimed is:

1. A dump trailer adapted to be removably connected to a fifth wheel on a tractor for transport; said dump trailer comprising:
    a trailer shell of a semicircular shape in cross section and having a pair of upper parallel side rails extending longitudinally along the upper edges of said shell;
    a plurality of generally parallel transverse U-shaped reinforcing ribs spaced along the length of said shell and secured to the outer surface of said semicircular shell between said side rails, said reinforcing ribs being of a minimum depth adjacent said side rails and being of a maximum depth at the bottom of said semicircular shell;
    a body bolster structure secured to said shell adjacent a rear end of said trailer, said body bolster structure including a longitudinally extending reinforcing member on said shell secured to at least one of said plurality of U-shaped reinforcing ribs; and
    another one of said plurality of U-shaped reinforcing ribs spaced forwardly of said body bolster structure and secured to the outer surface of said semicircular shell between said side rails.

2. A dump trailer as set forth in claim 1 wherein said reinforcing ribs are of an arcuate U-shape and increase in depth from said side rails to said bottom of said semicircular shell, said ribs having a maximum depth of between around 3 to 5 times greater than the minimum depth as measured in a direction perpendicular to the outer surface of said shell.

3. A dump trailer as set forth in claim 2 wherein said minimum depth is around three inches in thickness and said maximum depth is under around sixteen inches in thickness.

4. A dump trailer as set forth in claim 1 wherein said semicircular shell has a plurality of transverse sections welded to each other along transverse weld seams extending transversely about said semicircular shell, and said reinforcing ribs extend along said transverse weld seams.

5. A dump trailer as set forth in claim 4 wherein a splice plate covers each of said transverse weld seams, and said reinforcing ribs are welded to said shell over said splice plates.

6. A dump trailer as set forth in claim 1 wherein said shell has a front end wall and a pair of spaced parallel support members secured to said front end wall;
    a hydraulic cylinder is pivotally mounted between said support member adjacent the bottom of said shell; and
    a piston rod extends downwardly from said cylinder.

7. A dump trailer as set forth in claim 6 wherein:
    a support brace is pivotally mounted at one end to said shell intermediate the length thereof;
    a generally horizontal plate is pivotally mounted to the other end of said support brace and has a kingpin extending downwardly therefrom adapted for releasable connection to the fifth wheel of a tractor; and
    means secured to said plate laterally of said kingpin mounting said piston rod for pivotal movement.

8. A dump trailer as set forth in claim 6 wherein:
    said cylinder has a pair of opposed fixed trunnions extending from opposite sides of said cylinder; and
    a pair of opposed spaced brackets are removably secured to said pair of support members and have a pair of opposed openings therein receiving said trunnions in fully supporting relation whereby removal of said brackets from said support members effects removal of said cylinder from said support members to permit replacement of said cylinder.

9. A dump trailer adapted to be connected to a tractor for transport; said dump trailer comprising:
    a dump body including a semicircular shell having a front end portion and a rear end portion;
    a kingpin on said front end portion adapted to be removably connected to the fifth wheel of a tractor;
    a rear chassis beneath the rear end portion of said dump body having a pair of spaced suspension members thereon; and
    a bolster secured to the bottom of said shell over said chassis and mounted on said suspension members for pivotal movement about a horizontal axis, said bolster having a plurality of spaced parallel plates extending vertically from said horizontal axis to said shell and secured to said shell;
    said bolster including a continuous U-shaped reinforcing rib extending transversely of said bolster along the outer periphery of said semicircular shell from the upper sides of said shell and across the bottom of said shell;
    said U-shaped reinforcing rib of said bolster having a maximum depth adjacent the bottom of said shell and a gradually decreasing depth from said bottom to the upper sides of said shell.

10. A dump trailer as set forth in claim 9 wherein a second U-shaped reinforcing rib extends transversely along the end of said shell, and a plurality of stiffener strips extending longitudinally of said shell are secured to the upper ends of said vertical plates and to said shell for reinforcing said bolster.

11. A dump trailer as set forth in claim 10 wherein a horizontally extending shaft is secured to the lower ends of said plurality of vertically extending plates; and
    said suspension members have bearings supporting said shaft for relative pivotal movement.

* * * * *